(12) United States Patent
Wang et al.

(10) Patent No.: US 12,294,897 B2
(45) Date of Patent: May 6, 2025

(54) MOBILITY ENHANCEMENT IN A CONNECTED STATE

(71) Applicant: ZTE Corporation, Guangdong (CN)

(72) Inventors: Siqi Wang, Guangdong (CN); Xiaojuan Shi, Guangdong (CN); He Huang, Guangdong (CN); Yuan Gao, Guangdong (CN); Jing Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 443 days.

(21) Appl. No.: 17/401,186

(22) Filed: Aug. 12, 2021

(65) Prior Publication Data

US 2021/0377832 A1   Dec. 2, 2021

Related U.S. Application Data

(63) Continuation of application No. PCT/CN2019/075113, filed on Feb. 14, 2019.

(51) Int. Cl.
*H04W 36/00* (2009.01)
*H04W 36/08* (2009.01)
(Continued)

(52) U.S. Cl.
CPC ... *H04W 36/0058* (2018.08); *H04W 36/0033* (2013.01); *H04W 36/0061* (2013.01);
(Continued)

(58) Field of Classification Search
CPC .............................. H04W 36/00; H04W 36/08
See application file for complete search history.

(56) References Cited

U.S. PATENT DOCUMENTS 9,374,752 B2   6/2016   Giustina et al.
9,408,121 B2   8/2016   Xiao et al.
(Continued)

FOREIGN PATENT DOCUMENTS

CN   103220704 A   7/2013
CN   106537971 A   3/2017
(Continued)

OTHER PUBLICATIONS

Co-Pending RU Application No. 2021126803, RU Decision to Grant, mail date: Dec. 5, 2022, 15 pages with unofficial translation.
(Continued)

*Primary Examiner* — Muthuswamy G Manoharan
(74) *Attorney, Agent, or Firm* — Perkins Coie LLP

(57) ABSTRACT

Methods, systems, and devices related to related to digital wireless communication, and more specifically, to techniques related to improving mobility performance. In one exemplary aspect, a method for wireless communication includes receiving a transmission that includes conditional information for a handover of the terminal. The method also includes determining whether a candidate cell fulfills a condition for handover based on the conditional information. In another exemplary aspect, a method for wireless communication includes determining that there is no reference signal with a configured uplink grant with a measurement value that exceeds a threshold value. The method also includes initiating a random-access procedure. In another exemplary aspect, a method for wireless communication includes generating conditional information for a handover of a terminal. The method also includes transmitting a transmission that includes the conditional information to the terminal.

12 Claims, 7 Drawing Sheets

(51) Int. Cl.
*H04W 36/36* (2009.01)
*H04W 36/30* (2009.01)

(52) U.S. Cl.
CPC .... *H04W 36/362* (2023.05); *H04W 36/00838* (2023.05); *H04W 36/302* (2023.05)

(56) References Cited

U.S. PATENT DOCUMENTS

| | | | |
|---|---|---|---|
| 9,860,815 | B2 | 1/2018 | Yi et al. |
| 9,924,419 | B2 | 3/2018 | Moon et al. |
| 10,575,183 | B2 | 2/2020 | Futaki |
| 2014/0126545 | A1 | 5/2014 | Tamura et al. |
| 2015/0312818 | A1 | 10/2015 | Yiu et al. |
| 2018/0176811 | A1 | 6/2018 | Delsol et al. |
| 2018/0227805 | A1 | 8/2018 | Jang et al. |
| 2018/0317137 | A1 | 11/2018 | Loehr et al. |
| 2019/0098543 | A1* | 3/2019 | Kim ............ H04W 36/04 |
| 2019/0246323 | A1* | 8/2019 | Kim ............ H04W 36/305 |
| 2020/0045602 | A1 | 2/2020 | Jiang et al. |
| 2020/0154330 | A1* | 5/2020 | Paladugu ........ H04W 36/302 |
| 2020/0336957 | A1* | 10/2020 | Wu ............ H04W 36/085 |

FOREIGN PATENT DOCUMENTS

| | | |
|---|---|---|
| CN | 106664633 A | 5/2017 |
| CN | 106717086 A | 5/2017 |
| CN | 107113673 A | 8/2017 |
| CN | 108738092 A | 11/2018 |
| CN | 109314587 A | 2/2019 |
| RU | 2012120294 A | 11/2013 |
| WO | 2018/058513 A1 | 4/2018 |
| WO | 2018/230997 A1 | 12/2018 |

OTHER PUBLICATIONS

European Patent Office, extended European Search Report dated Sep. 8, 2022 for European Patent Application No. 19914870.1, 12 pages.
International Search Report and Written Opinion mailed on Nov. 13, 2019 for International Application No. PCT/CN2019/075113, filed on Feb. 14, 2019 (7 pages).
ETRI, "Considerations on Conditional Handover," 3GPP TSG-RAN WG2 Meeting #104, R2-1818047 (Re-submission of R2-1815244), Spokane, USA, Nov. 12-16, 2018, 6 pages.
Mediatek Inc., "Conditional Handover Procedures," 3GPP TSG-RAN WG2 Meeting #104, R2-1816959, Spokane, Washington, USA, Nov. 12-16, 2018, 6 pages.
Nokia et al., "Baseline of Conditional Handover and its optional enhancements," 3GPP TSG-RAN WG2 Meeting #104, R2-1817686, Spokane, USA, Nov. 12-16, 2018, 4 pages.
Chinese office action issued in CN Patent Application No. 202111650908.3, dated Jan. 12, 2024, 14 pages. English translation included.
Chinese office action issued in CN Patent Application No. 202111650908.3, dated Jun. 5, 2024, 19 pages. English translation included.
Korean office action issued in KR Patent Application No. 10-2021-7028838, dated May 22, 2024, 11 pages. English translation included.
European Communication pursuant to Article 94(3) EPC issued in EP Patent Application No. 19914870.1, dated Aug. 13, 2024, 5 pages.
Chinese office action issued in CN Patent Application No. 202111650908.3, dated Aug. 30, 2024, 18 pages. English translation included.
Korean office action issued in KR Patent Application No. 10-2021-7028838, dated Feb. 18, 2025, 5 pages. English translation included.
Chinese office action issued in CN Patent Application No. 202111650908.3, dated Nov. 7, 2024, 18 pages. English translation included.
European Communication pursuant to Article 94(3) EPC issued in EP Patent Application No. 19914870.1, dated Jan. 16, 2025, 5 pages.

* cited by examiner

| Short messages | |
|---|---|
| Bit | Short message |
| 1 | *systemInfoModification*<br>If set to 1: indication of a BCCH modification other than SIB6, SIB7 and SIB8. |
| 2 | *etwsAndCmasIndication*<br>If set to 1: indication of an ETWS primary notification and/or an ETWS secondary notification and/or a CMAS notification. |
| 3 | *stopIndicateCellInfo*<br>If set to 1, indication of acquiring SIBx immediately. |
| 4 – [8] | Not used in this release of the specification and may be ignored by UE if received. |

FIG. 3

MOBILITY ENHANCEMENT IN A CONNECTED STATE

CROSS-REFERENCE TO RELATED APPLICATIONS

This application is a continuation of and claims priority to International Patent Application No. PCT/CN2019/075113, filed on Feb. 14, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to improving mobility performance.

In one exemplary aspect, a method for wireless communication includes receiving a transmission that includes conditional information for a handover of the terminal. The method also includes determining whether a candidate cell fulfills a condition for handover based on the conditional information.

In another exemplary aspect, a method for wireless communication includes determining that there is no reference signal with a configured uplink grant with a measurement value that exceeds a threshold value. The method also includes initiating a random-access procedure.

In another exemplary aspect, a method for wireless communication includes generating conditional information for a handover of a terminal. The method also includes transmitting a transmission that includes the conditional information to the terminal.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

FIG. 3 illustrates a table depicting the content of short messages.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

This patent document describes techniques that can be implemented to improve mobility performance. Mobility performance is an important performance metric for LTE and NR. Many services in addition to traditional voice and internet data service may include various QoS requirements. For example, some services may include ultra-reliability and low latency, including remote control, aerial, industrial automation, industrial control, Augmented Reality (AR), Virtual Reality (VR) etc. For such services, mobility performance including reliability and very low interruption time may attempt to lower interruption time during handover to a latency target.

Figure 1:
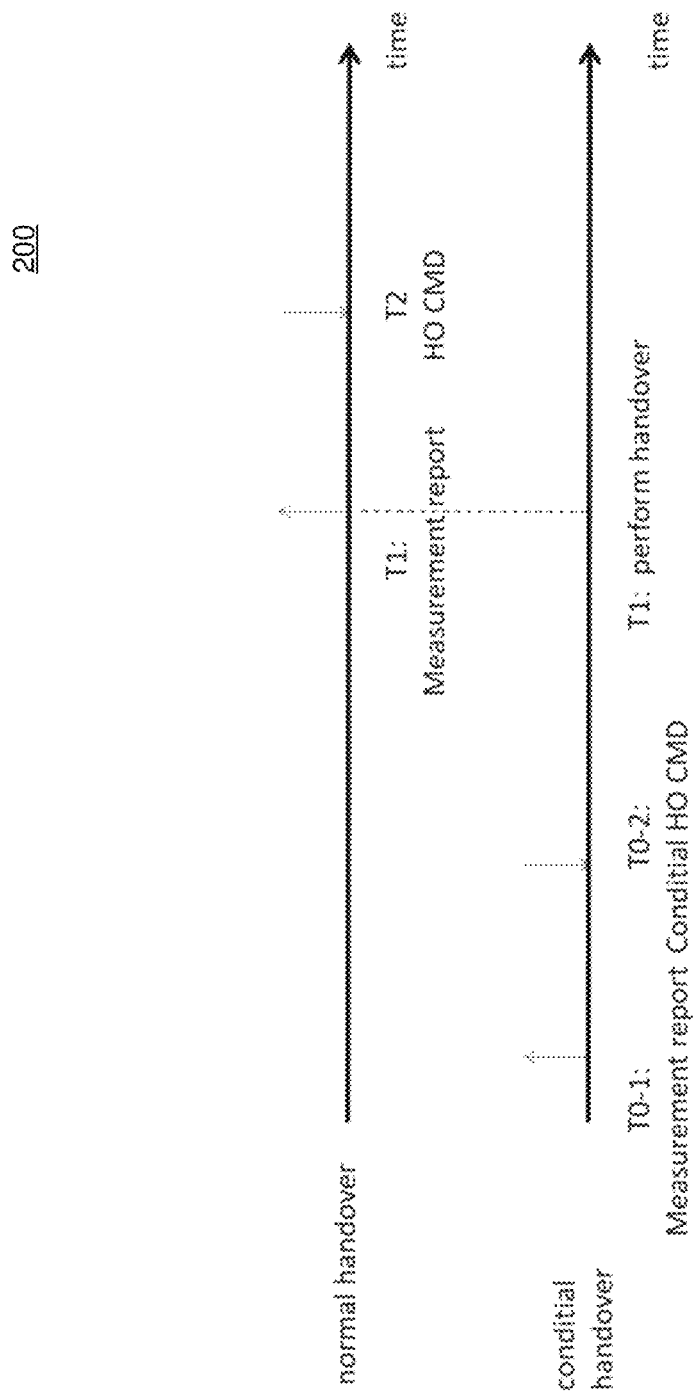
FIG. 1 illustrates a timing process for conditional handover.

FIG. 1 illustrates a timing process for conditional handover. As illustrated in FIG. 1, for normal handover, the UE may perform measurements according to a network configuration (e.g. the measurement configuration from the network). At a first time (T1), the UE may send a measurement report to the source cell. The measurement results of the handover target(s) (i.e. target cell(s)) may be included in the measurement report. With the reception of the measurement report, the source cell may identify a target cell. The source cell may transmit handover request to the target cell and receive a handover request acknowledgment message from the target cell. At a second time (T2), the source cell may send a handover command (HO CMD) to the UE. If the HO CMD is successfully received, the UE may perform handover to the target. In a normal handover procedure, the measurement report may be triggered when the quality of the target cell is good enough for the UE to access. In an example, the quality of the source cell may become so poor or is deteriorating so quickly at the same time, and the measurement report and/or the HO CMD are vulnerable to fail. In such an event, handover may be initiated.

Conditional handover may include providing the HO CMD at an earlier time, e.g. providing the HO CMD when the quality of the source cell is good enough. As illustrated in FIG. 1, the source cell may control a UE's measurement that an earlier measurement report is triggered at time T0-1 when the source quality is sufficient. Similarly, the measurement results of the handover target(s) may be included in the measurement report. At time T0-1, the target cell(s) included in the measurement report may be insufficient for the UE to access. With the reception of the early measurement report, the source cell may send a handover request to the target cell and receive a handover request acknowledge from the target. At time T0-2, the source cell may issue the conditional handover command (CHO CMD) to the UE. The UE may keep measurements and when the quality of a target cell indicated in the CHO CMD is good enough for the UE to access, e.g. at time T1, the UE perform handover to the target cell.

Example Embodiment 1

Figure 2:
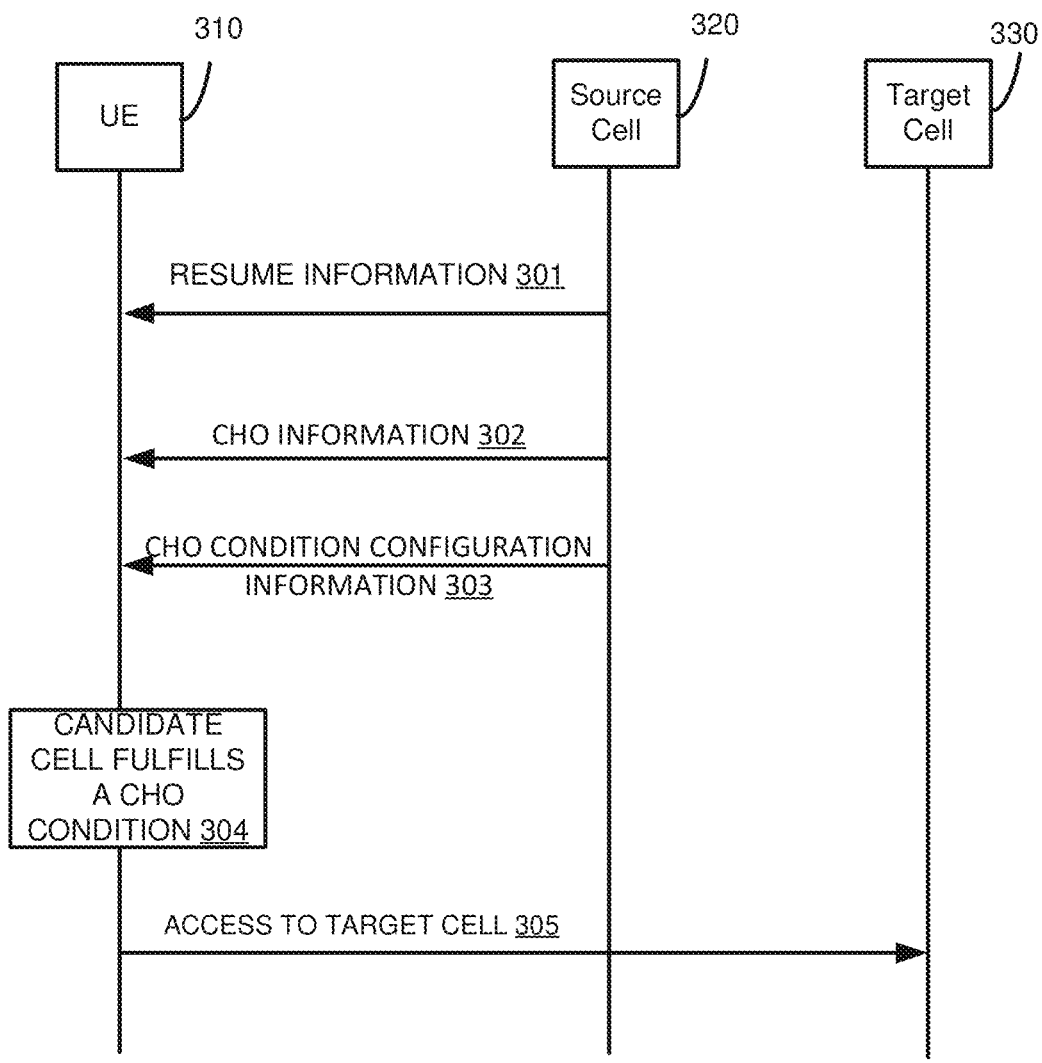
FIG. 2 illustrates a signaling process for conditional handover.

FIG. 2 illustrates a signaling process for conditional handover. As shown in FIG. 2, Step 301 includes transmitting from a source cell 320 to the terminal 310 resume information. In step 302, the source cell 320 transmits CHO information to the terminal 310. In step 303, the source cell 320 transmits CHO condition configuration information to the terminal 310. In some embodiments, any of the resume information and the CHO condition configuration information may be transmitted before, after, or at the same time as the CHO information. The resume information and CHO condition configuration information can be provided to the UE in a single radio resource control (RRC) message or in two separate RRC messages. The CHO condition configuration information may be transmitted with the CHO information in a single transmission.

In Step 304, the terminal 310 may determine whether a candidate cell fulfills a CHO condition. In step 305, the terminal may access a target cell.

Transmitting CHO Information

As noted in Step 302 of FIG. 2, CHO information may be transmitted from a source cell to the terminal. In a first embodiment, a method to provide CHO information is disclosed. In this embodiment, a network (i.e. source cell) may provide CHO information to one or more UEs via the transmission scheduled by a common Radio Network Temporary Identifier (RNTI).

The common RNTI can be a first type RNTI which is monitored by all the UEs in the cell. The first type RNTI can be a Paging RNTI (P-RNTI), a System Information RNTI (SI-RNTI) etc. The common RNTI can be a second type RNTI which can be configured to multiple UEs in the cell. The second type RNTI can be a Slot Format Indication RNTI (SFI-RNTI) or a new RNTI which is introduced for this purpose.

The transmission scheduled by a common RNTI can include one of a System Information Block (SIB), a Paging Message, a new RRC message, or one or more transport blocks.

In the following, examples are given for the various methods to provide CHO information. In a first example, network provides the CHO information to UEs via the broadcast of a SIB (e.g., SIBx). The SIBx may be scheduled by SI-RNTI.

In a second example, the network issues a Short message to UEs. The Short messages may include an indication which tells the UE to acquire the SIB (e.g. SIBx). The UE may acquire the SIBx immediately upon receiving the Short messages. An example of the indicator included in the short messages may include a candidatecellinfo. FIG. 3 illustrates a table depicting the content of short messages. The Short messages may be scheduled by P-RNTI. The SIB (e.g. SIBx) may include the CHO information and may be scheduled by SI-RNTI.

In a third example, the network issues a Downlink Control Information (DCI) format with CRC scrambled by a second type RNTI (e.g. SFI-RNTI or a new introduced RNTI). The DCI format can include an indicator which tells the UE to acquire the SIB (e.g. SIBx). The UE may acquire SIBx immediately upon receiving the DCI format.

In a fourth example, the network issues a DCI format with CRC scrambled by a second type RNTI (e.g. SFI-RNTI or a new introduced RNTI). The DCI format may include information (e.g. Frequency domain resource assignment, Time domain resource assignment, etc.) scheduling physical downlink shared channel (PDSCH). The UE may receive the PDSCH that includes the CHO information. The CHO information transmitted on the PDSCH can be a RRC message or one or more transport blocks.

In a fifth example, the network provides the CHO information to UEs via the Paging message. The Paging message may be scheduled by P-RNTI.

The network may transmit the CHO information to one of more UEs via the transmission scheduled by a common RNTI, as indicated in a first embodiment. The network may transmit the CHO information to a UE via a RRC message which is issued dedicated to a specific UE, e.g. scheduled by the unique UE identifier, e.g. Cell RNTI(C-RNTI) used as an identifier of the RRC Connection.

The network may provide the CHO information to UEs via the transmission scheduled by a common RNTI. Then in the following, the network can send a RRC message which is issued dedicated to a UE, e.g. scheduled by the unique UE identifier (e.g. C-RNTI) to change the CHO information for this UE. In the RRC message, at least one of parameters of the candidate cell(s) that has been provided to the UE may be modified, the candidate cell(s) that has been provided to the UE can be deleted/released, and new candidate cell(s) can be added.

Figure 4:
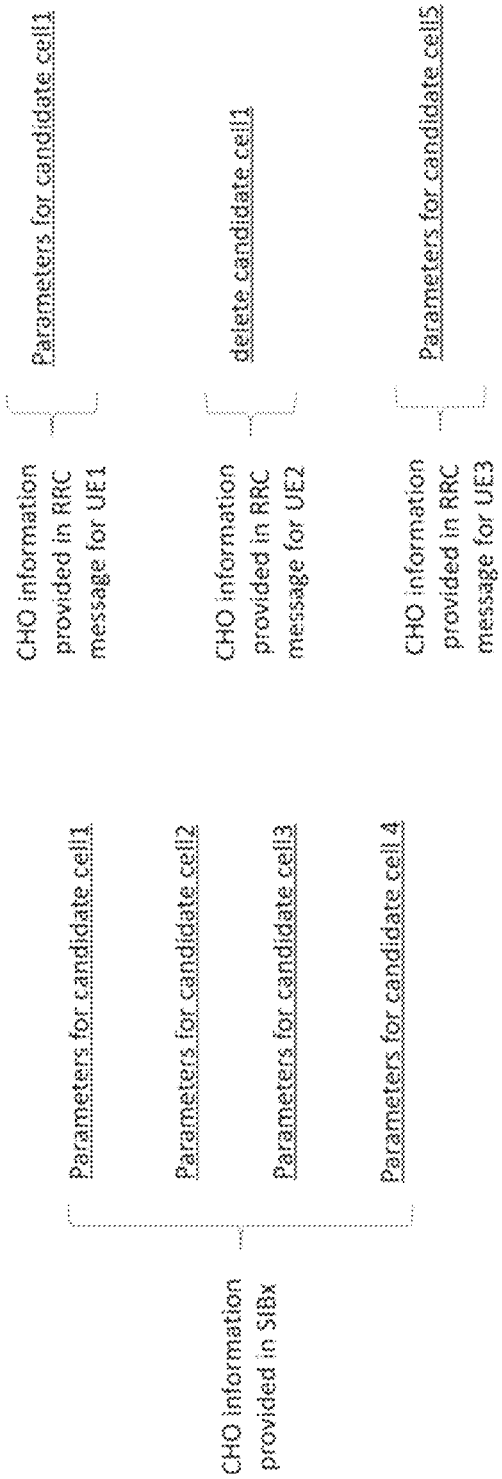
FIG. 4 illustrates an example flow process for transmitting conditional handover information.

FIG. 4 illustrates an example flow process for transmitting conditional handover information. The network may broadcast CHO information in SIBx. The parameters of four candidate cells may be included in SIBx. The SIBx can be received by all of the UEs in the cell. In this example, UE1, UE2 and UE3 have accessed the cell. The network may determine to change the CHO information for these three UEs. As illustrated in FIG. 4, the network may send a RRC message (e.g. RRCReconfiguration message) to UE1. Only some of or all of the parameters for candidate cell1 may be included in the message. With the reception of the RRC message, UE1 may update the parameters for candidate cells and keep the other three candidate cells (candidate cell 2-4) unchanged. The network may send a RRC message to UE2. In the message, the network may indicate to delete candidate cell1 for UE2. With the reception of the RRC message, UE2 may delete candidate cell1 which is received from SIBx and keep the other three candidate cells (candidate cell 2-4) unchanged. The network may send a RRC message to UE2. In the message, the parameters for candidate cell5 may be included. With the reception of the RRC message, UE2 may store the parameters for candidate cell5 and keep the four candidate cells received from SIBx unchanged.

The CHO information may include a candidate cell list. One or multiple candidate cells are included in the candidate cell list. The CHO information for each candidate cell may include at least one of an index allocated for the candidate cell, an absolute Frequency of the SSB, i.e. the ARFCN of the SSB, a Physical Cell Identity (PCI), a position of (first) DM-RS for downlink and uplink (e.g. dmrs-TypeA-Position), a Subcarrier Spacing, and cell specific parameters, e.g. the parameters that contained in a current information element ServingCellConfigCommonSIB.

In an embodiment, candidate cell selection information can be included in the CHO information. The candidate cell selection information can include at least one of a priority for each candidate cell, a cell type for each candidate cell, and separate candidate cell lists corresponding to different cell type.

As an example, when to apply the conditional handover to a Non-Terrestrial Network (NTN), the above candidate cell selection information can be set in multiple ways. For the case where the candidate cell selection information is a priority, for a candidate cell of the NTN, the priority may be set to "0" (or the priority is absent). In a second case where a candidate cell of the Terrestrial Network(TN), the priority is set to "1." In this case, when multiple candidate cells fulfill the corresponding CHO condition, the UE may select the candidate cell(s) with priority set as "1" in priority.

For the case that the candidate cell selection information is a cell type, for a candidate cell of the NTN, the cell type may be set to the value standing for NTN (or the cell type is absent). For a candidate cell of the TN, the cell type may be set to the value standing for TN. In this case, when multiple candidate cells fulfill the corresponding CHO condition, the UE may select the candidate cell(s) with cell type set as the value standing for TN in priority.

In an embodiment, the candidate cell selection information is denoted by including separate candidate cell lists corresponding to different cell type. Two separate candidate cell lists may be included. One list (List-TN) may include candidate cells of the TN and the other list (List-NTN) may include candidate cells of the NTN. In this case, when multiple candidate cells fulfill the corresponding CHO condition, the UE may select the candidate cell(s) within List-TN in priority.

Transmitting Resume Information and CHO Condition Configuration Information

As illustrated in Step 303 of FIG. 2, the source cell may provide CHO condition configuration information to the UE. The network may transmit the CHO information to one or more UEs via a transmission scheduled by a common RNTI. In this case, the CHO information may be provided to multiple UEs or all UEs in the source cell. In other words, the CHO information may be common to group of UEs, or at some of the UEs in the source cell.

In a first embodiment, the CHO condition configuration information may be provided with the CHO information. In this embodiment, the information may be transmitted in a transmission scheduled by a common RNTI. The information may be provided in an RRC message that is dedicated to a UE (e.g., scheduled by a unique UE identifier).

In the first embodiment, a single CHO condition configuration can be provided. The single CHO condition configuration may apply to all of the candidate cells contained in the CHO information. Alternatively, individual CHO condition configurations can be provided for each candidate cells contained in the CHO information. In an embodiment, a single CHO condition configuration and individual CHO condition configurations for each candidate cells contained in the CHO information can be provided.

For the case of a single CHO condition configuration, the CHO condition configuration can be at least one of the following: A RSRP threshold for the serving cell (i.e. the source cell), a RSRQ threshold for the serving cell (i.e. the source cell), a SINR threshold for the serving cell (i.e. the source cell), a RSRP threshold for the candidate cells,
   a RSRQ threshold for the candidate cells, and a SINR threshold for the candidate cells.

For the case of individual CHO condition configurations for each candidate cells contained in the CHO information, the CHO condition configuration can be at least one of the following: a RSRP threshold for a candidate cell in the CHO information, a RSRQ threshold for a candidate cell in the CHO information, and a SINR threshold for a candidate cell in the CHO information.

For the case of a single CHO condition configuration and individual CHO condition configurations for each candidate cells contained in the CHO information, the CHO condition configuration can be at least one of the following: a RSRP threshold for the serving cell (i.e. the source cell) and a RSRP threshold for a candidate cell in the CHO information, a RSRQ threshold for the serving cell (i.e. the source cell) and a RSRQ threshold for a candidate cell in the CHO information, and a SINR threshold for the serving cell (i.e. the source cell) and a SINR threshold for a candidate cell in the CHO information.

In a second embodiment, the CHO condition configuration information may be provided as part of a measurement configuration (MeasConfig). In this embodiment, the CHO condition configuration may be provided to a UE in the MeasConfig contained a RRC message (e.g. RRCReconfiguration). The RRC message may be issued dedicated to this UE, e.g. scheduled by the unique UE identifier, e.g. C-RNTI. The MeasConfig may specify the measurements to be performed by the UE.

In this embodiment, a list for add and modify the MeasId(s) for CHO conditions and a list for remove the MeasId(s) for CHO conditions can be added in the MeasConfig. For example, the list to add and/or modify the MeasId(s) for CHO conditions can be a MeasIdForCHOAddModList SEQUENCE (SIZE (1 . . . maxNrofMeasId)) of the MeasId. As another example, the list for remove the MeasId(s) for CHO conditions can be set as a MeasIdForCHORemoveLis SEQUENCE (SIZE (1 . . . maxNrofMeasId)) of the MeasId.

The MeasId may be used to identify a measurement configuration, i.e., linking of a measurement object and a reporting configuration. When configuring the MeasConfig for a UE, the network can determine that each candidate cell that provided to the UE belongs to the measurement object corresponding to at least one MeasId that is included in the MeasIdForCHOAddModList. The network may configure just some of the candidate cells, each of which belongs to the measurement object corresponding to at least one MeasId that is included in the MeasIdForCHOAddModList. If a candidate cell belongs to no measurement object corresponding to the MeasId(s) included in the MeasIdForCHOAddModList, the cell may not be considered a candidate cell for this UE.

In a third embodiment, any of the features of the first embodiment and the second embodiment may be combined.

As illustrated in Step 301 of FIG. 2, the source cell may provide resume information to the UE. The network may transmit the resume information to the UE via a RRC message. The RRC message may be dedicated to a UE, e.g. scheduled by the unique UE identifier (e.g., C-RNTI).

The resume information may include the RNTI which can identify the UE context. The RNTI can be a new RNTI introduced for this purpose, a Inactive RNTI (I-RNTI), or a Short I-RNTI. The resume information may also include a Next Hop Chaining Count (NCC).

Candidate Cell Fulfills a CHO Condition

As noted in Step 304 of FIG. 2, a candidate cell may fulfill the corresponding CHO condition. Whether a cell fulfills the corresponding CHO condition depends on the CHO condition configuration provided by the network. For the case of a single CHO condition configuration is provided by the network, a cell fulfills the CHO condition if one of the following occurs:

A RSRP of the serving cell falls below the RSRP threshold for the serving cell and RSRP of the candidate cell exceeds the RSRP threshold for the candidate cells.

A RSRQ of the serving cell falls below the RSRQ threshold for the serving cell and RSRQ of the candidate cell exceeds the RSRQ threshold for the candidate cells.

A SINR of the serving cell falls below the SINR threshold for the serving cell and SINR of the candidate cell exceeds the SINR threshold for the candidate cells.

A RSRP of the candidate cell exceeds the RSRP threshold for the candidate cells.

A RSRQ of the candidate cell exceeds the RSRQ threshold for the candidate cells.

A SINR of the candidate cell exceeds the SINR threshold for the candidate cells.

A first timer (e.g. T310 timer) is started and RSRP of the candidate cell exceeds the RSRP threshold for the candidate cells.

A first timer (e.g. T310 timer) is started and RSRQ of the candidate cell exceeds the RSRQ threshold for the candidate cells.

A first timer (e.g. T310 timer) is started and SINR of the candidate cell exceeds the SINR threshold for the candidate cells.

A second timer (e.g. T312 timer) is started and RSRP of the candidate cell exceeds the RSRP threshold for the candidate cells.

A second timer (e.g. T312 timer) is started and RSRQ of the candidate cell exceeds the RSRQ threshold for the candidate cells.

A second timer (e.g. T312 timer) is started and SINR of the candidate cell exceeds the SINR threshold for the candidate cells.

For the case of individual CHO condition configurations for each candidate cells contained in the CHO information is provided by the network, a cell fulfills the CHO condition if one of the following occurs:

A RSRP of the candidate cell exceeds the RSRP threshold for this candidate cell.

A RSRQ of the candidate cell exceeds the RSRQ threshold for this candidate cell.

A SINR of the candidate cell exceeds the SINR threshold for this candidate cell.

A first timer (e.g. T310 timer) is started and RSRP of the candidate cell exceeds the RSRP threshold for this candidate cell.

A first timer (e.g. T310 timer) is started and RSRQ of the candidate cell exceeds the RSRQ threshold for this candidate cell.

A first timer (e.g. T310 timer) is started and SINR of the candidate cell exceeds the SINR threshold for this candidate cell.

A second timer (e.g. T312 timer) is started and RSRP of the candidate cell exceeds the RSRP threshold for this candidate cell.

A second timer (e.g. T312 timer) is started and RSRQ of the candidate cell exceeds the RSRQ threshold for this candidate cell.

A second timer (e.g. T312 timer) is started and SINR of the candidate cell exceeds the SINR threshold for this candidate cell.

For the case of a single CHO condition configuration and individual CHO condition configurations for each candidate cells contained in the CHO information is provided by the network, a cell may fulfill the CHO condition if one of the following occurs:

A RSRP of the serving cell falls below the RSRP threshold for the serving cell and RSRP of the candidate cell exceeds the RSRP threshold for this candidate cell.

A RSRQ of the serving cell falls below the RSRQ threshold for the serving cell and RSRQ of the candidate cell exceeds the RSRQ threshold for this candidate cell.

A SINR of the serving cell falls below the SINR threshold for the serving cell and SINR of the candidate cell exceeds the SINR threshold for this candidate cell.

A first timer (e.g. T310 timer) is started and RSRP of the candidate cell exceeds the RSRP threshold for this candidate cell;

A first timer (e.g. T310 timer) is started and RSRQ of the candidate cell exceeds the RSRQ threshold for this candidate cell.

A first timer (e.g. T310 timer) is started and SINR of the candidate cell exceeds the SINR threshold for this candidate cell.

A second timer (e.g T312 timer) is started and RSRP of the candidate cell exceeds than the RSRP threshold for this candidate cell.

A second timer (e.g T312 timer) is started and RSRQ of the candidate cell exceeds than the RSRQ threshold for this candidate cell.

A second timer (e.g T312 timer) is started and SINR of the candidate cell exceeds than the SINR threshold for this candidate cell.

For the case of the CHO condition configuration is provided by the network in the MeasConfig, a cell may fulfill the CHO condition if the cell fulfills the event of the reporting configuration corresponding to a MeasId configured in the MeasIdForCHOAddModList.

As noted in Step 305 of FIG. 2, the UE may access a target cell. A candidate cell may fulfill the corresponding CHO condition. The UE may access the candidate cell (or a 'target cell'). The UE may access the candidate cell either via RRC connection resume or normal handover.

Select Access Category and Perform Access Control

In a first embodiment, the terminal may select Access Category 0 and consider the access attempt as allowed.

In a second embodiment, the terminal may select Access Category #x and perform access control. The Access Category #x can be a new Access Category or one of the Access Category other than 0 (e.g., Access Category 8).

In a third embodiment, the terminal may defer access barring checks (i.e. Access Category selection and access control) until the UE has obtained valid UAC information from the target cell, i.e. until the UE has successfully accessed the target cell.

In case of UE accessing the candidate cell via RRC connection resume, the UE may introduce a new resume Cause. The new resume cause may indicate that it is the RRC connection resume for conditional handover. The UE may include the new resume cause in a RRCResumeRequest message or a RRCResumeRequest1 message.

In order to improve the robustness of the handover, UE may store the information of all candidate cells until it successfully access a target. In other words, the UE may discard the candidate cells until it successfully accesses a target. If handover to target fails, the UE may select another candidate cell which fulfills the corresponding CHO condition to perform handover. If handover to target fails, the UE may select one of the candidate cells to perform RRC Reestablishment.

RACH-less handover has been introduced in many cases. The random-access procedure may be skipped in the RACH-less handover. The UE may access the target via the pre-allocated UL-grant configured in the handover command (e.g. RRCReconfiguration message). If there is no pre-allocated UL-grant configured in the handover command, the UE may monitor the PDCCH of the target cell. This may improve the performance of RACH-less handover.

For a beamforming-based system, e.g. 5G new radio, besides the time and frequency domain, an additional dimension (beam) may be introduced. To allow the network to achieve the beam training, i.e. identify the DL beam during the RACH-less handover, when providing pre-allocated UL-grant in the handover command (e.g. RRCReconfiguration message), the network can configure SSB or CSI-RS associated UL-grant(s) in the handover command. The UE may select a qualified beam (e.g. SSB/CSI-RS with RSRP above the configured threshold) and access the target via the associated UL grant. The target gNB can identify the DL beam (SSB or CSI-RS) according to the received PUSCH and the association between the UL grant and SSB/CSI-RS.

In many cases, there may be no qualified beam for a long time period. For example, in a case, there may be no qualified beam during the running of T304 (The timer is send to UE in the handover command to control the handover execution time). This may indicate that in this case, the UE can't access the target during T304. After T304 expires, the UE may initiate the RRC re-establishment procedure, which would cause a long interruption to the UE. Based on this, the UE may perform one of the following.

In a first case, if no SSB with RSRP above the threshold among the SSBs configured with UL-grant is available and no CSI-RS with RSRP above the threshold among the CSI-RSs configured with UL-grant is available, the UE performs random access to the target cell.

In a second case, if no SSB with RSRP above the threshold among the SSBs configured with UL-grant is available and no CSI-RS with RSRP above the threshold among the CSI-RSs configured with UL-grant is available when a timer Tx is running, the UE performs random access to the target cell. The value of the timer Tx may be shorter than T304.

Figure 5:
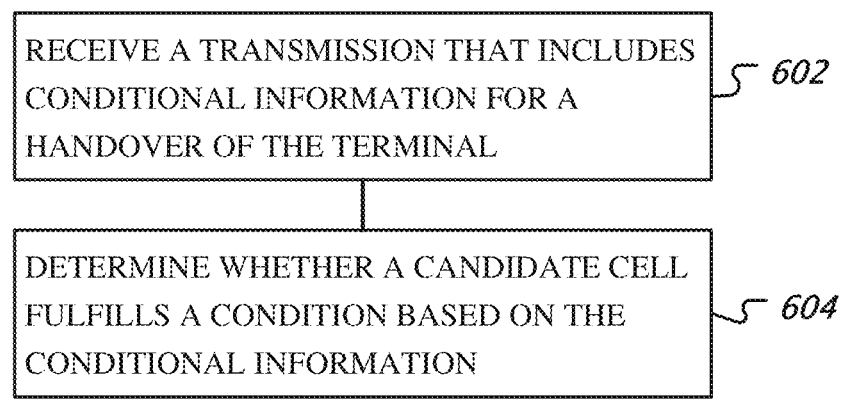
FIG. 5 illustrates a block diagram of a method to improve mobility performance.

FIG. 5 illustrates a block diagram of a method to improve mobility performance. A terminal may receive a transmission that includes conditional information for a handover of the terminal (block 602). The method also includes determining whether a candidate cell fulfills a condition based on the conditional information. (block 604).

In some embodiments, the method includes receiving, by the terminal, resume information from the source cell.

In some embodiments, the method includes receiving, by the terminal, condition configuration information from the source cell.

In some embodiments, the method includes transmitting, by the terminal, an access message to the candidate cell based on determining that the candidate cell fulfills the condition.

In some embodiments, the command is transmitted via a scheduled transmission using a common radio network temporary identifier (RNTI).

In some embodiments, the transmission is scheduled using a common radio network temporary identifier (RNTI).

In some embodiments, the common RNTI includes a first RNTI that is configured to be monitored by each terminal in the source cell.

In some embodiments, the common RNTI includes a second RNTI that is configured to one or more terminals in the source cell.

In some embodiments, the transmission includes one of a system information block (SIB), a paging message, a new radio resource control (RRC) message, and at least one transport block.

In some embodiments, the method includes receiving, by the terminal, a RRC message scheduled by a unique terminal identifier and dedicated to the terminal; and modifying, by the terminal, the conditional information included in the transmission based on receiving the RRC message.

In some embodiments, the RRC message includes at least one of a parameter of at least one candidate cell that is to be modified, an indication that a candidate cell provided in the transmission be released, and an indication to add a new candidate cell.

In some embodiments, the conditional information includes a listing of one or more candidate cells.

In some embodiments, wherein the candidate cell in the listing of the one or more candidate cells includes at least one of an index for a candidate cell, an absolute frequency of a synchronization signal block (SSB), a physical cell identity (PCI), a position for a first demodulation reference signal (DM-RS) for downlink and uplink transmission, a subcarrier spacing, and a cell-specific parameter.

In some embodiments, the conditional information includes candidate cell selection information, wherein the candidate cell selection information includes at least one of a priority for each candidate cell in the listing of candidate cells, a cell type for each candidate cell in the listing of candidate cells, and a separate listing of candidate cells for each cell type.

In some embodiments, the condition configuration information included within the transmission.

In some embodiments, the condition configuration information includes a single condition configuration that applies to all candidate cells included in the transmission.

In some embodiments, the single condition configuration includes at least one of a first threshold value for the source cell and a second threshold value for the candidate cells.

In some embodiments, the condition configuration information includes a separate condition configuration that applies to a candidate cell included in the transmission.

In some embodiments, the separate condition configuration includes a third threshold value for a candidate cell.

In some embodiments, the condition configuration information includes a single condition configuration and a separate condition configuration for each candidate cell.

In some embodiments, the single condition configuration includes a fourth threshold value for the source cell; wherein the separate condition configuration includes a fifth threshold value for a candidate cell.

In some embodiments, the condition configuration information is transmitted via a measurement configuration (MeasConfig) information element in a RRC message, wherein the MeasConfig information element specifies measurements for the terminal to perform.

In some embodiments, the MeasConfig includes a list to add or modify a MesaConfig identifier (MeasID) for the conditions and a list to remove the MeasID for conditions.

In some embodiments, the resume information includes at least one of a RNTI that identifies a terminal context and a next hop chaining count (NCC).

In some embodiments, the candidate cell fulfills the condition based on determining that the measurement result of the source cell falls below the first threshold value for the source cell and determining that the measurement result of the candidate cell exceeds the second threshold value for the candidate cells.

In some embodiments, the candidate cell fulfills the condition based on determining that the measurement result of the candidate cell exceeds the second threshold value for the candidate cells.

In some embodiments, the candidate cell fulfills the condition based on determining that a first timer is started and the measurement result of the candidate cell exceeds the second threshold value for the candidate cells.

In some embodiments, the candidate cell fulfills the condition based on determining that a second timer is started and the measurement result of the candidate cell exceeds the second threshold value for the candidate cells included in the command.

In some embodiments, the candidate cell fulfills the condition based on determining that a measurement result of the candidate cell exceeds the third threshold value for this candidate cell.

In some embodiments, the candidate cell fulfills the condition based on determining that a first timer is started and the measurement result of the candidate cell exceeds the third threshold value for this candidate cell.

In some embodiments, the candidate cell fulfills the condition based on determining that a second timer is started and the measurement result of the candidate cell exceeds the third threshold value for this candidate cell.

In some embodiments, the candidate cell fulfills the condition based on determining that the measurement result of the source cell falls below the fourth threshold value for the source cell and determining that the measurement result of the candidate cell exceeds the fifth threshold value for this candidate cell.

In some embodiments, the candidate cell fulfills the condition based on determining that a first timer is started and the measurement result of the candidate cell exceeds the fifth threshold value for this candidate cell.

In some embodiments, the candidate cell fulfills the condition based on determining that a second timer is started and the measurement result of the candidate cell exceeds the fifth threshold value for this candidate cell.

In some embodiments, the method includes selecting, by the terminal, a first access category, wherein the terminal determines that an access attempt is allowed based on selecting the first access category.

In some embodiments, the method includes selecting, by the terminal, a second access category; and performing, by the terminal, an access control procedure based on the selected second access category.

In some embodiments, the method includes receiving, by the terminal, valid unified access control (UAC) information from the candidate cell, wherein the terminal defers access barring check, until the terminal has received the valid UAC information from the candidate cell.

In some embodiments, the access message is a RRC connection resume message that indicates a new resume cause, wherein the new resume cause indicates the RRC connection resume message for conditional handover.

In some embodiments, the method includes discarding, by the terminal, the conditional information based on successfully transmitting the access message to the candidate cell.

In some embodiments, the method includes determining, by the terminal, that access to the candidate cell was unsuccessful; and selecting, by the terminal, a second candidate cell that fulfills the condition.

In some embodiments, the method includes determining, by the terminal, that access to the candidate cell was unsuccessful; and transmitting, by the terminal, a RRC reestablishment message to a second candidate cell.

In another exemplary aspect, a method for wireless communication includes determining that there is no reference signal with a configured uplink grant with a measurement value that exceeds a threshold value. The method also includes initiating a random-access procedure.

In some embodiments, the reference signal includes at least one of a synchronization signal block (SSB) and a channel state information reference signal (CSI-RS), and wherein said determining includes determining that no SSB with a reference signal received power (RSRP) value that exceeds a threshold RSRP value among any SSB configured with uplink grant and no CSI-RS with a RSRP value that exceeds the threshold RSRP value among the CSI-RSs configured with uplink grant.

In some embodiments, said determining includes determining that no SSB with a RSRP value that exceeds a threshold RSRP value among any SSB configured with uplink grant and no CSI-RS with a RSRP value that exceeds the threshold RSRP value among the CSI-RSs configured with uplink grant when a timer is running.

In another embodiment, a method for wireless communication includes generating, by a source cell, conditional information for a handover of a terminal. The method also includes transmitting, by the source cell, a transmission that includes the conditional information to the terminal.

In some embodiments, the method includes transmitting, by the source cell, resume information to the terminal.

In some embodiments, the method includes transmitting, by the source cell, condition configuration information to the terminal.

In some embodiments, the terminal is configured to determine whether a candidate cell fulfills a condition for handover based on the conditional information.

Figure 6:
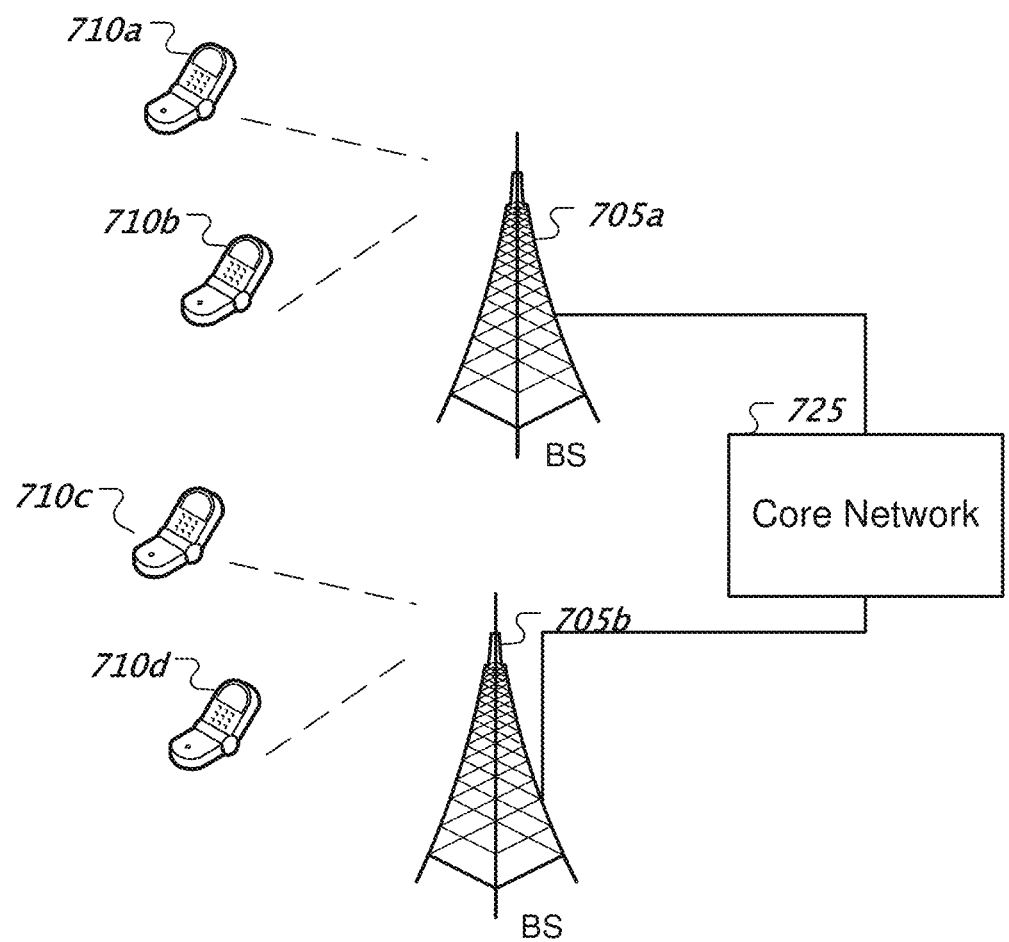
FIG. 6 shows an example of a wireless communication system where techniques in accordance with one or more embodiments of the present technology can be applied.

In some embodiments, the terminal is configured to transmit an access message to the candidate cell based on determining that the candidate cell fulfills the condition FIG. 6 shows an example of a wireless communication system where techniques in accordance with one or more embodiments of the present technology can be applied. A wireless communication system 700 can include one or more base stations (BSs) 705*a*, 705*b*, one or more wireless devices 710*a*, 710*b*, 710*c*, 710*d*, and a core network 725. A base station 705*a*, 705*b* can provide wireless service to wireless devices 710*a*, 710*b*, 710*c* and 710*d* in one or more wireless sectors. In some implementations, a base station 705*a*, 705*b* includes directional antennas to produce two or more directional beams to provide wireless coverage in different sectors.

The core network 725 can communicate with one or more base stations 705*a*, 705*b*. The core network 725 provides connectivity with other wireless communication systems and wired communication systems. The core network may include one or more service subscription databases to store information related to the subscribed wireless devices 710*a*, 710*b*, 710*c*, and 710*d*. A first base station 705*a* can provide wireless service based on a first radio access technology, whereas a second base station 705*b* can provide wireless service based on a second radio access technology. The base stations 705*a* and 705*b* may be co-located or may be separately installed in the field according to the deployment scenario. The wireless devices 710*a*, 710*b*, 710*c*, and 710*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 7:
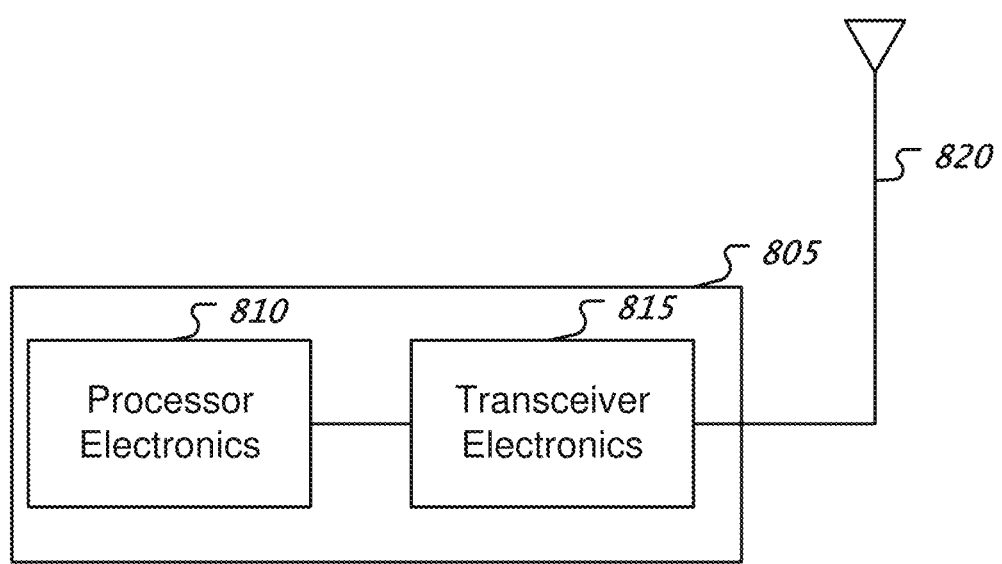
FIG. 7 is a block diagram representation of a portion of a hardware platform.

FIG. 7 is a block diagram representation of a portion of a hardware platform. A hardware platform 805 such as a network device or a base station or a wireless device (or UE) can include processor electronics 810 such as a microprocessor that implements one or more of the techniques presented in this document. The hardware platform 805 can include transceiver electronics 815 to send and/or receive wired or wireless signals over one or more communication interfaces such as antenna 820 or a wireline interface. The hardware platform 805 can implement other communication interfaces with defined protocols for transmitting and receiving data. The hardware platform 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the hardware platform 805.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:
1. A method for wireless communication, comprising:
receiving, by a terminal from a source cell, a transmission that includes a condition configuration information for a handover of the terminal;

determining, by the terminal, that a plurality of candidate cells fulfills a condition for handover based on the condition configuration information, wherein the condition configuration information includes a single condition configuration that applies to all candidate cells included in the transmission and a separate condition configuration that applies to a candidate cell of the all candidate cells included in the transmission, wherein the condition configuration information includes candidate cell selection information that includes at least one of a priority for each candidate cell, a cell type for each candidate cell, or separate candidate cell lists corresponding to different cell type, wherein the priority for each candidate cell depends on the cell type for each candidate cell, and in a case that a candidate cell with a higher-priority cell type and a candidate cell with a lower-priority cell type are present, the candidate cell with the higher-priority cell type is selected, wherein the condition configuration information includes a first threshold value for the source cell and a second threshold value for the candidate cell, and wherein the terminal considers that the candidate cell fulfills the condition based on determining that a measurement result of the source cell falls below the first threshold value and a measurement result of the candidate cell exceeds the second threshold value, wherein the first threshold value for the source cell and the second threshold value for the candidate cell include at least one of: a reference signal received power (RSRP) threshold for the source cell and a RSRP threshold for the candidate cell; a reference signal received quality (RSRQ) threshold for the source cell and a RSRQ threshold for the candidate cell; or a signal-to-interference-plus-noise ratio (SINR) threshold for the source cell and a SINR threshold for the candidate cell; and selecting, by the terminal, one candidate cell of the plurality of candidate cells.

2. The method of claim 1, further comprising:

transmitting, by the terminal, an access message to the candidate cell based on determining that the candidate cell fulfills the condition.

3. The method of claim 1, wherein the condition configuration information is transmitted via a measurement configuration (MeasConfig) information element in a radio resource control (RRC) message, wherein the MeasConfig information element specifies measurements for the terminal to perform.

4. A method for wireless communication, comprising:

generating, by a source cell, a condition configuration information for a handover of a terminal;

transmitting, by the source cell, a transmission that includes the condition configuration information to the terminal, wherein the terminal determines that a plurality of candidate cells fulfills a condition for handover based on the condition configuration information, wherein the condition configuration information includes a single condition configuration that applies to all candidate cells included in the transmission and a separate condition configuration that applies to a candidate cell of the all candidate cells included in the transmission, wherein the condition configuration information includes candidate cell selection information that includes at least one of a priority for each candidate cell, a cell type for each candidate cell, or separate candidate cell lists corresponding to different cell type, wherein the priority for each candidate cell depends on the cell type for each candidate cell, and in a case that a candidate cell with a higher-priority cell type and a candidate cell with a lower-priority cell type are present, the candidate cell with the higher-priority cell type is selected, wherein the condition configuration information includes a first threshold value for the source cell and a second threshold value for the candidate cell, and wherein the candidate cell fulfills the condition based on determining that a measurement result of the source cell falls below the first threshold value and a measurement result of the candidate cell exceeds the second threshold value, wherein the first threshold value for the source cell and the second threshold value for the candidate cell include at least one of: a reference signal received power (RSRP) threshold for the source cell and a RSRP threshold for the candidate cell; a reference signal received quality (RSRQ) threshold for the source cell and a RSRQ threshold for the candidate cell; or a signal-to-interference-plus-noise ratio (SINR) threshold for the source cell and a SINR threshold for the candidate cell, wherein the terminal selects one candidate cell of the plurality of candidate cells.

5. The method of claim 4, wherein the terminal is configured to transmit an access message to the candidate cell based on determining that the candidate cell fulfills the condition.

6. The method of claim 4, wherein the condition configuration information is transmitted via a measurement configuration (MeasConfig) information element in a RRC message, wherein the MeasConfig information element specifies measurements for the terminal to perform.

7. An apparatus for wireless communication comprising a processor that is configured to carry out a method, the method comprising:

receiving, by a terminal from a source cell, a transmission that includes a condition configuration information for a handover of the terminal;

determining, by the terminal, that a plurality of candidate cells fulfills a condition for handover based on the condition configuration information, wherein the condition configuration information includes a single condition configuration that applies to all candidate cells included in the transmission and a separate condition configuration that applies to a candidate cell of the all candidate cells included in the transmission, wherein the condition configuration information includes candidate cell selection information that includes at least one of a priority for each candidate cell, a cell type for each candidate cell, or separate candidate cell lists corresponding to different cell type, wherein the priority for each candidate cell depends on the cell type for each candidate cell, and in a case that a candidate cell with a higher-priority cell type and a candidate cell with a lower-priority cell type are present, the candidate cell with the higher-priority cell type is selected, wherein the condition configuration information includes a first threshold value for the source cell and a second threshold value for the candidate cell, and wherein the terminal considers that the candidate cell fulfills the condition based on determining that a measurement result of the source cell falls below the first threshold value and a measurement result of the candidate cell exceeds the second threshold value, wherein the first threshold value for the source cell and the second threshold value for the candidate cell include at least one of: a reference signal received power (RSRP) threshold for the source cell and a RSRP threshold for the candidate cell; a reference signal received quality (RSRQ) threshold for the source cell and a RSRQ threshold for the candidate cell; or a signal-to-interference-plus-noise ratio (SINR) threshold for the source cell and a SINR threshold for the candidate cell; and selecting, by the terminal, one candidate cell of the plurality of candidate cells.

8. The apparatus of claim 7, wherein the method further comprises:

transmitting, by the terminal, an access message to the candidate cell based on determining that the candidate cell fulfills the condition.

9. The apparatus of claim 7, wherein the condition configuration information is transmitted via a measurement configuration (MeasConfig) information element in a RRC message, wherein the MeasConfig information element specifies measurements for the terminal to perform.

10. An apparatus for wireless communication comprising a processor that is configured to carry out a method, the method comprising:

generating, by a source cell, a condition configuration information for a handover of a terminal;

transmitting, by the source cell, a transmission that includes the condition configuration information to the terminal, wherein the terminal determines that a plurality of candidate cells fulfills a condition for handover based on the condition configuration information, wherein the condition configuration information includes a single condition configuration that applies to all candidate cells included in the transmission and a separate condition configuration that applies to a candidate cell of the all candidate cells included in the transmission, wherein the condition configuration information includes candidate cell selection information that includes at least one of a priority for each candidate cell, a cell type for each candidate cell, or separate candidate cell lists corresponding to different cell type, wherein the priority for each candidate cell depends on the cell type for each candidate cell, and in a case that a candidate cell with a higher-priority cell type and a candidate cell with a lower-priority cell type are present, the candidate cell with the higher-priority cell type is selected, wherein the condition configuration information includes a first threshold value for the source cell and a second threshold value for the candidate cell, and wherein the candidate cell fulfills the condition based on determining that a measurement result of the source cell falls below the first threshold value and a measurement result of the candidate cell exceeds the second threshold value, wherein the first threshold value for the source cell and the second threshold value for the candidate cell include at least one of: a reference signal received power (RSRP) threshold for the source cell and a RSRP threshold for the candidate cell; a reference signal received quality (RSRQ) threshold for the source cell and a RSRQ threshold for the candidate cell; or a signal-to-interference-plus-noise ratio (SINR) threshold for the source cell and a SINR threshold for the candidate cell, wherein the terminal selects one candidate cell of the plurality of candidate cells.

11. The apparatus of claim 10, wherein the terminal is configured to transmit an access message to the candidate cell based on determining that the candidate cell fulfills the condition.

12. The apparatus of claim 10, wherein the condition configuration information is transmitted via a measurement configuration (MeasConfig) information element in a RRC message, wherein the MeasConfig information element specifies measurements for the terminal to perform.

* * * * *